US006711338B2

(12) United States Patent
Lin et al.

(10) Patent No.: US 6,711,338 B2
(45) Date of Patent: Mar. 23, 2004

(54) JUMPER CABLE MODULE

(75) Inventors: Kon Mang Lin, Pennington, NJ (US); John R. Morris, Jr., Cranbury, NJ (US); Ivan Pawlenko, Holland, PA (US); Larry Samson, Langhorne, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 208 days.

(21) Appl. No.: 10/083,909

(22) Filed: Feb. 27, 2002

(65) Prior Publication Data

US 2003/0161607 A1 Aug. 28, 2003

(51) Int. Cl.⁷ .................................................. G02B 6/00
(52) U.S. Cl. ....................................... 385/135; 385/147
(58) Field of Search ............................... 385/134–136, 385/147; 439/501, 502, 507

(56) References Cited

U.S. PATENT DOCUMENTS

| 5,430,823 A | | 7/1995 | Dupont et al. | |
| 5,448,015 A | | 9/1995 | Jamet et al. | |
| 5,894,540 A | * | 4/1999 | Drewing | 385/135 |
| 6,195,494 B1 | * | 2/2001 | Abbott et al. | 385/134 |
| 6,360,050 B1 | * | 3/2002 | Moua et al. | 385/135 |
| 6,434,314 B1 | * | 8/2002 | Gatica et al. | 385/136 |
| 6,584,269 B1 | * | 6/2003 | Mitchell et al. | 385/136 |

* cited by examiner

Primary Examiner—John D. Lee
Assistant Examiner—Mike Stahl

(57) ABSTRACT

A jumper cable module for use, e.g., with optical and/or electrical equipment. The module provides proper tensioning for jumper cables and retains them in a protected manner. In one embodiment, the module includes a pulley and an eccentric cam pivotally connected to a base plate. A jumper cable is wrapped around grooves in the pulley and cam such that the connectorized ends of the cable extend out and attach to the specified connection points. The cam is turned about its axle to produce the desired tension of the cable. For maintaining the tension, the cam may incorporate a tensioning mechanism, e.g., a spring-loaded ball mechanism or serrated edge ratchet. When the cable needs to be removed from the module, the tensioning mechanism is disengaged and the cam is turned to create slack in the cable for ease of cable removal. A module that includes stacks of pulleys and cams may handle multiple jumper cables. Certain modules of the present invention reduce damage to and improve handling of fiber optic jumper cables during installation and maintenance of optical communication equipment.

20 Claims, 7 Drawing Sheets

JUMPER CABLE MODULE

BACKGROUND OF THE INVENTION

1. Field of the Invention

The present invention relates to electrical and optical equipment.

2. Description of the Related Art

Voice and data communications equipment is often designed such that printed circuit boards fitted with faceplates are inserted side-by-side into card cages. Connectorized assemblies (e.g., fiber optic jumper cables terminated at each end with a connector) are used to transmit (optical) signals from point to point within the card cage, e.g., from the circuit board to the faceplate, between two points within the same circuit board, between two different circuit boards, etc. Typically, four to eight fiber optic jumper cables may be used per circuit board in a cage. In some instances, an even greater number of jumper cables per circuit board may be required. Additional fiber optic jumper cables may also be needed for connections between different card cages, cabinets, or shelves.

Under current practice, two ends of a fiber optic jumper cable are connectorized and manually attached to the specified points, e.g., to the circuit board and faceplate. The amount of slack in the fiber between the points of attachment may vary depending on the distance between those points, length of the jumper cable, and other geometrical or topological constraints. In addition, jumper cables are often intentionally made longer than would be necessary to make the specified connections in order to have an extra length of fiber for repairs, such as replacement of broken connectors or removal of damaged sections of fiber. For these reasons, fiber optic jumper cables often end up dangling, jutting out, or otherwise protruding, e.g., from the surface of the circuit board.

During installation and/or maintenance, circuit boards are usually inserted into and/or pulled out of the card cage. An often occurring problem is that a dangling or protruding fiber optic jumper cable is damaged when it catches an obstacle, e.g., a piece of equipment within the cage, constriction of the card slot, or another jumper cable protruding from a different circuit board. Repair and replacement of the damaged fiber optic jumper cables may add significantly to the operational cost of telecommunication equipment.

SUMMARY OF THE INVENTION

In one embodiment, the present invention provides a jumper cable module for use with communication equipment. The module provides proper tensioning for jumper cables and retains them in a protected manner. The module includes a pulley and an eccentric cam pivotally connected to a base plate. A jumper cable is wrapped around grooves in the pulley and cam such that the connectorized ends of the cable extend out and attach to particular connection points (e.g., on the same or on two different circuit boards). The cam is turned about its axle to produce the desired tension of the cable. For maintaining the tension, the cam may incorporate a tensioning mechanism, e.g., a spring-loaded ball mechanism or a serrated edge ratchet. When the cable needs to be removed from the module, the tensioning mechanism is disengaged and the cam is turned to create slack in the cable for ease of cable removal. A module that includes stacks of pulleys and cams may handle multiple jumper cables. The present invention can be used to reduce damage to and improve handling of jumper cables during installation and maintenance of communication equipment.

According to one embodiment, the present invention is a jumper cable module, comprising: (a) a pulley connected to a base plate; and (b) a cam pivotally connected to said base plate, wherein: the jumper cable module is configured to provide tensioning to a jumper cable (i) placed within the jumper cable module and (ii) connected to connection points, which tensioning is achieved by rotating the cam to a selected angular position.

According to another embodiment, the present invention is a method of tensioning a jumper cable connected to connection points, the method comprising the steps of: (a) placing the jumper cable within a jumper module, wherein the jumper cable module comprises a pulley connected to a base plate and a cam pivotally connected to said base plate; and (b) rotating the cam to a selected angular position to achieve desired tension in the jumper cable.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Although the invention is particularly suitable for use with circuit boards and fiber optic jumper cables those skilled in the art can appreciate that the invention can be equally applied to other types of electrical or optical equipment and/or other types of cable, including electrical cables/wiring.

Figure 1A:
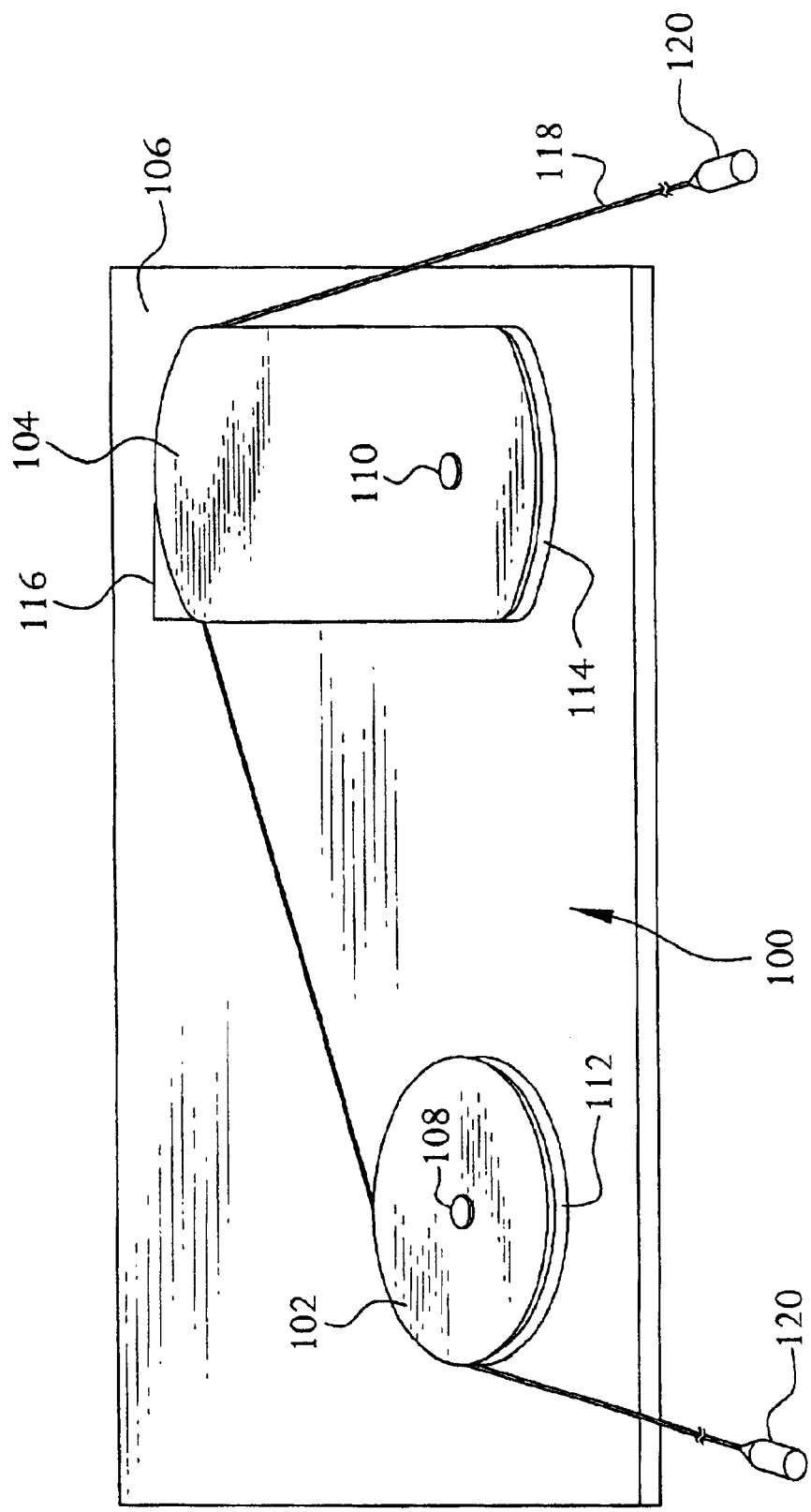
FIG. 1A is a perspective view of a fiber optic jumper module according to one embodiment of the present invention.

FIG. 1A shows a perspective view of a fiber optic jumper module 100 according to one embodiment of the present invention. Module 100 comprises a pulley 102 and an eccentric cam 104. Both pulley 102 and cam 104 are connected to a base plate 106. In one embodiment, base plate 106 may be part of a circuit board. In different embodiments, base plate 106 may be a separate board in a card cage or part of module 100. Pulley 102 may have an optional axle 108 configured to rotatably connect pulley 102 to base plate 106. In an embodiment that does not include axle 108, pulley 102 may be fixedly attached to base plate 106. Cam 104 is pivotally connected to base plate 106 using an off-center axle 110. Cam 104 may also have an optional ear 116 that can be grasped for turning cam 104 about axle 110. Along their respective perimeters, both pulley 102 and cam 104 incorporate grooves 112 and 114, in which a fiber optic jumper cable 118 can be placed. Cable 118 typically includes connectors 120 that may be connected to particular connection points, e.g., on a circuit board or faceplate.

Figure 1B:
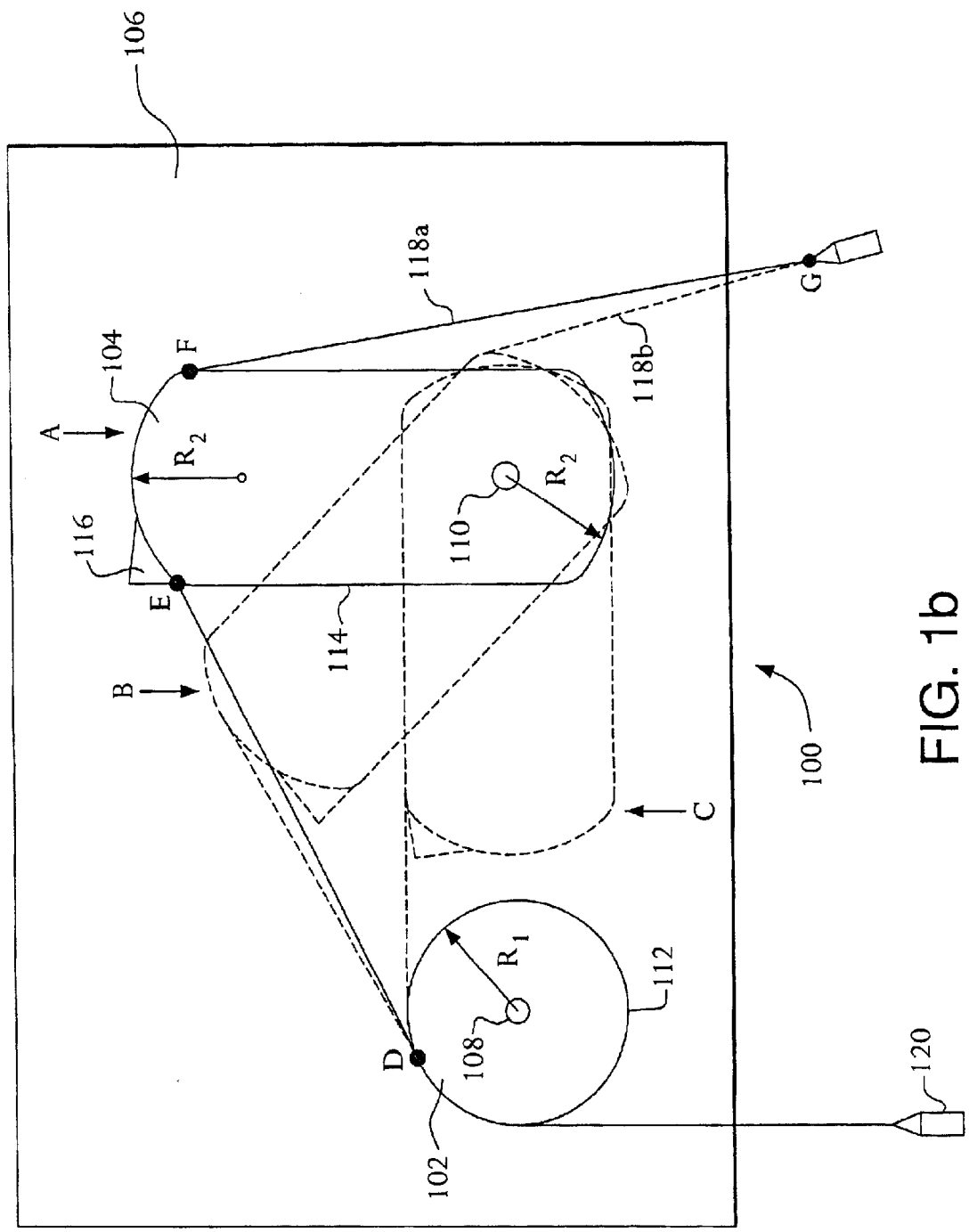
FIG. 1B is a top view of the fiber optic jumper module of FIG. 1A illustrating the use of the module with fiber optic jumper cables of two different lengths.

FIG. 1B shows a top view of module 100 and demonstrates the principles of using the module with fiber optic jumper cables of varying lengths. Illustratively, the operation of module 100 with a relatively long cable 118a and a relatively short cable 118b is shown. The following representative steps may be used to engage module 100. Cable 118a or 118b is connected to a first connection point using one connector 120. The cable is then placed within groove 112 of pulley 102 and optionally wrapped around the pulley within the groove one or more times. With cam 104 oriented at position C, the cable is then placed within groove 114 of cam 104 and connected to a second connection point using the other connector 120. To remove any unwanted slack, cam 104 is then rotated (clockwise in FIG. 1B) about axle 110 to produce the desired tension in the cable. For example, for the relatively long cable 118a, cam 104 is rotated clockwise from position C to position A and fixed in position A. Similarly, for the relatively short cable 118b, cam 104 is rotated clockwise from position C to position B and fixed in position B shown by the dashed line in FIG. 1B. For fixing the cam in a desired position, e.g., positions A or B, and maintaining the desired tension of the cable, cam 104 may incorporate a tensioning mechanism, possible embodiments of which are disclosed below in the context of FIGS. 5 and 6. Subsequently, if cable 118 needs to be removed from module 100, the tensioning mechanism is disengaged and cam 104 is turned back toward position C (e.g., counterclockwise in FIG. 1B) to create slack in the cable for ease of cable removal from groove 114 of cam 104 and/or groove 112 of pulley 102.

In one embodiment, pulley 102 is a grooved disk having a radius of $R_1$, where $R_1$ is preferably larger than the greater of the acceptable bend radius of cable 118 (defined as the bend radius at which leakage of light from the optical fiber in the cable due to its curvature exceeds a predetermined level) and the critical bend radius of cable 118 (defined as the radius at which the optical fiber in the cable breaks). Cam 104 is a grooved plate, e.g., having the shape of a rectangle with rounded corners. Similar to pulley 102, the rounding radius $R_2$ of the cam is chosen based on the acceptable and critical bend radii of cable 118. Depending on the implementation, $R_1$ may equal $R_2$. Furthermore, different shapes, e.g., a bar, an oval, or a rounded triangle, may be utilized for pulley 102 and/or cam 104. In addition, axle 110 may be centrally located on cam 104.

Figure 2:
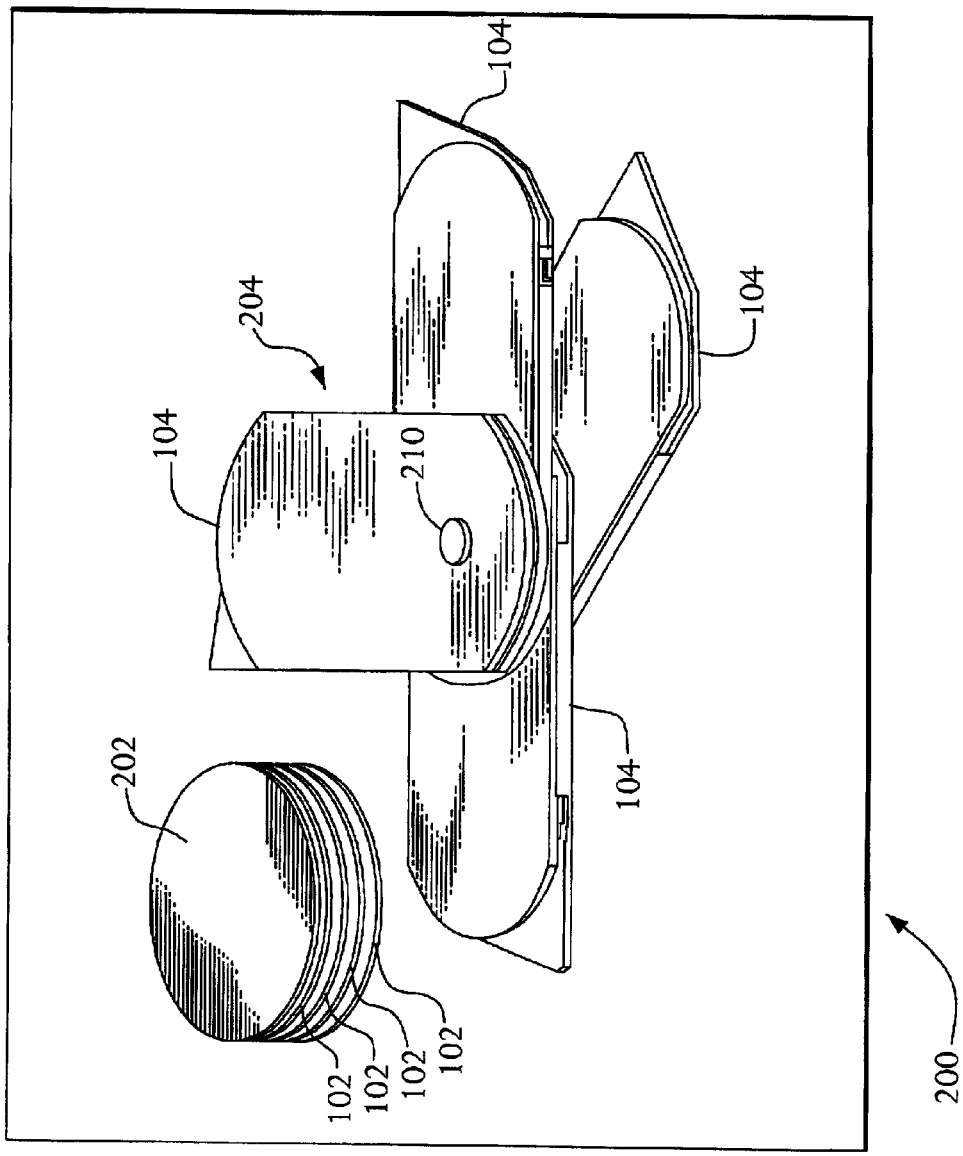
FIG. 2 is a perspective view of a fiber optic jumper module according to another embodiment of the present invention.

FIG. 2 shows a perspective view of a fiber optic jumper module 200 according to another embodiment of the present invention. Module 200 comprises a stack 202 of pulleys 102 and a corresponding stack 204 of eccentric cams 104. In one embodiment, stack 202 includes four pulleys 102 and stack 204 includes four cams 104. Each individual cam 104 of stack 204 can swivel around axle 210 independently of the other cams in the stack. Also, each cam 104 of stack 204 can independently be fixed in a desired position using its individual tensioning mechanism.

In operation of module 200, a fiber optic jumper cable is wrapped around a pulley 102 of stack 202 and inserted into the groove of the corresponding cam 104 of stack 204, which cam and pulley are preferably located at the same vertical position in their respective stacks. Then, the cam is rotated and fixed as described above to produce the desired tension on the cable. This procedure may be repeated for each corresponding pulley/cam pair for a different fiber optic jumper cable. In the embodiment shown in FIG. 2, module 200 can accommodate up to four different cables. In different embodiments, stacks 202 and 204 may have more or fewer than four pulleys and cams, respectively, and accommodate a corresponding number of different cables.

Figure 3:
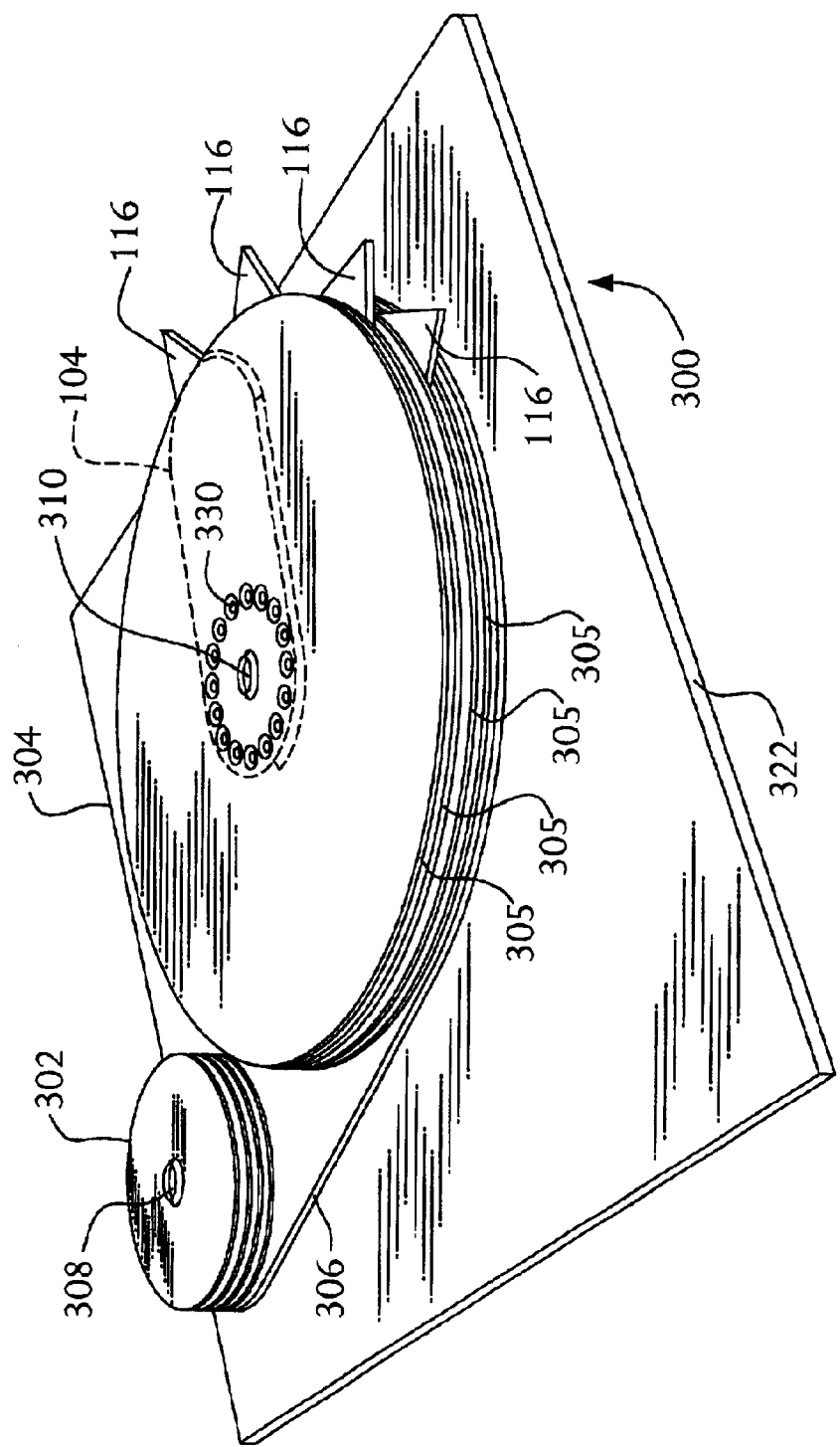
FIG. 3 is a perspective view of a fiber optic jumper module according to yet another embodiment of the present invention.

FIG. 3 shows a perspective view of a fiber optic jumper module 300 according to yet another embodiment of the present invention. Module 300 comprises a stack 302 of four pulleys and a stack 304 of four cams. Therefore, similar to module 200 of FIG. 2, module 300 can accommodate up to four fiber optic jumper cables. However, a different structure for the stack of cams (stack 304) is used in module 300 compared to that (stack 204) in module 200. Similar to stack 204, stack 304 includes four cams 104. Only one cam 104 of stack 304 is illustrated in FIG. 3 (see dashed line). The other cams 104 are not visible in the view presented in FIG. 3 except for their ears 116. In addition to four cams 104, stack 304 also includes four round plates 305, three of which are inserted between cams 104 and the fourth one is placed on top of the topmost cam 104. In a preferred embodiment, each plate 305 is attached to cam 104 located beneath that plate such that the center of plate 305 corresponds to the pivoting point of cam 104. Each cam/plate pair is rotatably connected to base plate 306 by an axle 310 of stack 304. Plates 305 in module 300 serve the purpose of reducing the exposed length of cable within the module. In particular, plates 305 enclose and protect from possible damage at least part of the length of cable corresponding to sections DE and FG of cable 118a of FIG. 1B.

Figure 4:
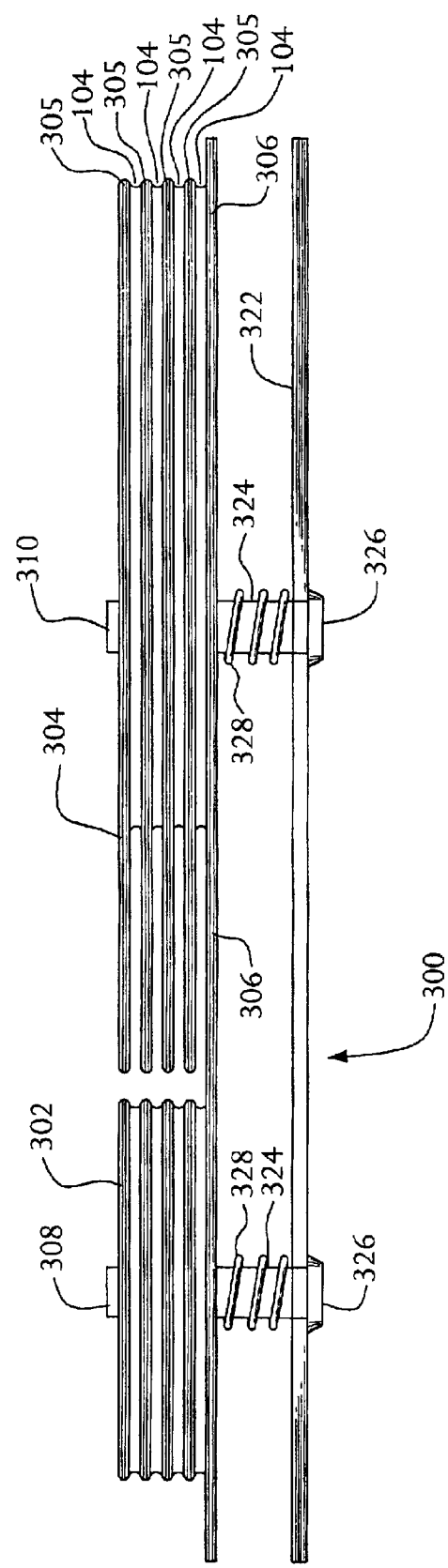
FIG. 4 is a side view of the fiber optic jumper module shown in FIG. 3.

FIG. 4 shows a side view of module 300. Stacks 302 and 304 are pivotally connected to a base plate 306 using axles 308 and 310, respectively. Module 300 may be attached to a board 322, which can be, e.g., a circuit board, using spring-loaded legs 324. In one embodiment, module 300 has two legs 324 located beneath the pivot points of stacks 302 and 304. In different embodiments, one, three, or more legs 324 located at different points may be used. Each leg 324 has an elastic compressible head 326 and a spring 328. To attach module 300 to board 322, head 326 is squeezed and pushed though a round opening in board 322, which opening preferably has a diameter slightly smaller than that of head 326. After protruding through the opening, head 326 expands and locks spring 328 in a partially compressed state between base plate 306 and board 322. The expansion force of spring 328 provides support for module 300.

Figure 5:
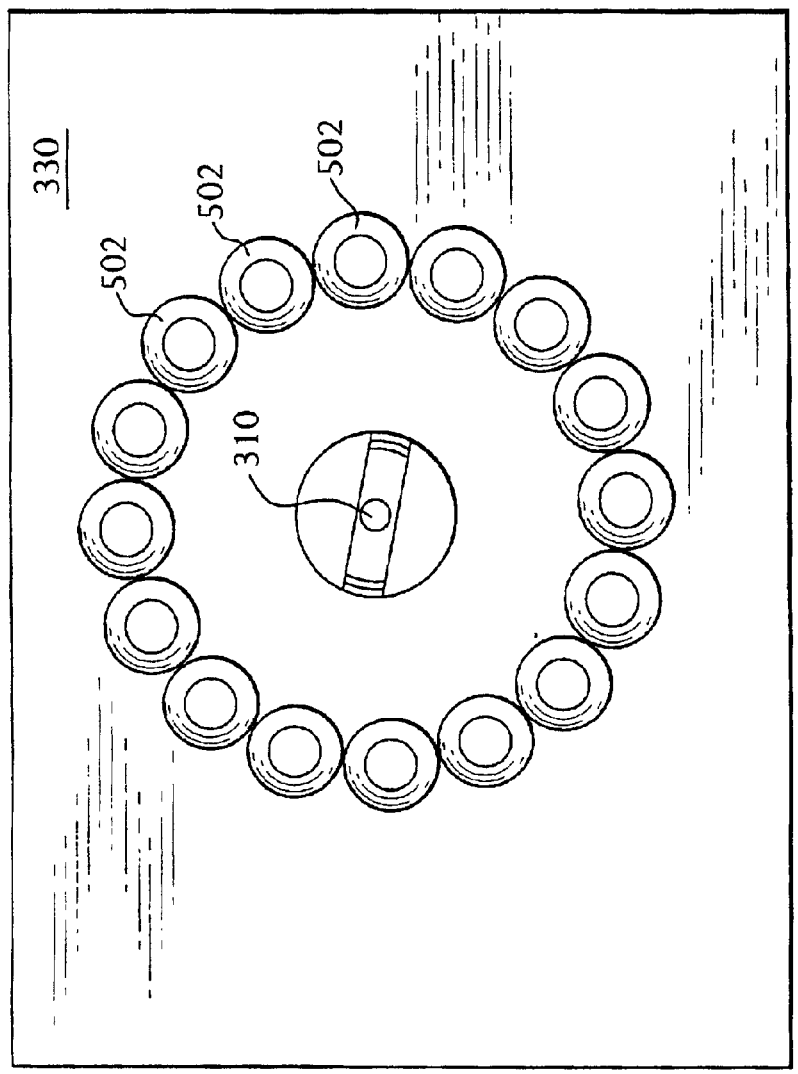
FIG. 5 is a top view of part of the tensioning mechanism of the fiber optic jumper module shown in FIG. 3.

FIG. 5 shows a top view of a tensioning mechanism 330 of module 300, also shown in FIG. 3. Mechanism 330 comprises sixteen nested holes 502 in each plate 305 of stack 304, sixteen matching nested holes in each cam 104 of stack 304, and sixteen matching nested holes in base plate 306. The nested holes are arranged in a circle around axle 310 as shown in FIG. 5. Mechanism 330 further comprises at least four pairs of spring-loaded balls (not shown). At least one pair of spring-loaded balls is inserted between each cam 104 and plate 305 located beneath that cam such that the balls are nested in the matching holes. For the bottom-most cam 104, at least one pair of spring-loaded balls is inserted in a similar fashion between that cam and base plate 306.

In operation, tensioning mechanism 330 can fix each cam 104 of module 300 in sixteen different angular positions using the locking action of a spring-loaded ball settled into one of the sixteen nested holes of that cam. To change the angular position of cam 104, that cam is rotated such that the spring-loaded ball skips and settles into a different nested hole. For the particular embodiment of mechanism 330 shown in FIG. 5, the angular position of each cam 104 in stack 304 can be changed with increments corresponding to about 22.5 degrees (i.e., 1/16-th of a full turn). In different embodiments of mechanism 330, different increments may be implemented using a different number of nested holes.

Figure 6:
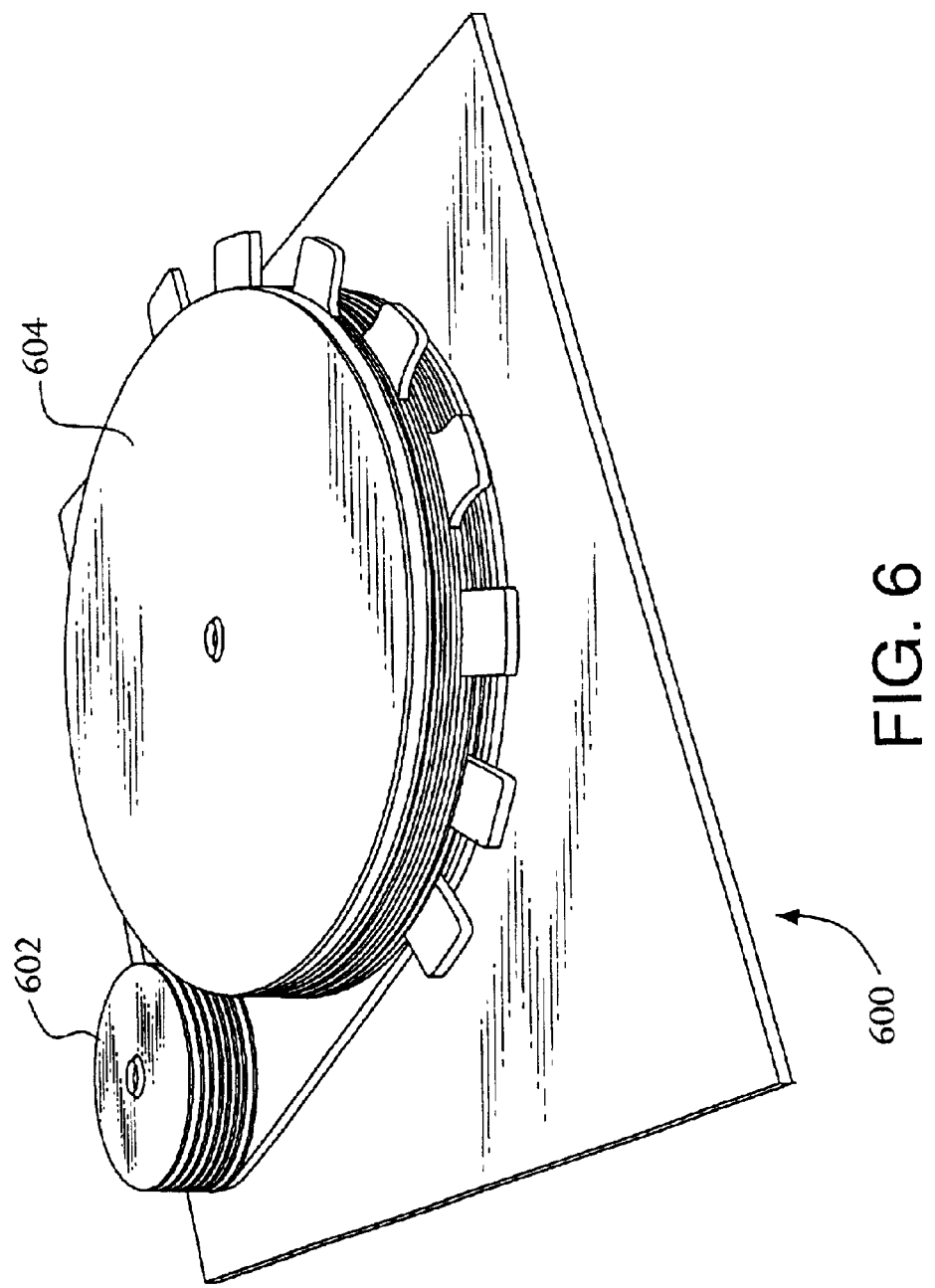
FIG. 6 is a perspective view of a fiber optic jumper module according to still another embodiment of the present invention.

FIG. 6 shows a perspective view of a fiber optic jumper module 600 according to still another embodiment of the present invention. Module 600 is similar to module 300 of FIG. 3. However, one difference between these two modules is that stacks 602 and 604 of module 600 include eight pulleys and cams compared to four pulleys/cams in stacks 302 and 304 of module 300. Therefore, module 600 can accommodate up to eight fiber optic jumper cables compared to four cables for module 300. Another difference between these two modules is the tensioning mechanism. Module 600 has a serrated edge ratchet, well known in the art, instead of mechanism 330 for module 300. In different embodiments, other designs of tensioning mechanisms, such as button stopper, coil, or friction stopper arrangements, can also be applied. In general, any suitable tensioning mechanisms that can fix an individual cam in a desired position and maintain proper tension of a jumper cable may be used with jumper cable modules of the present invention.

Modules 100, 200, 300, and 600 may be loaded with fiber optic jumper cables at the point of manufacture, by a third party, or at the point of installation onto a circuit board. A module can be part of a circuit board or a separate unit inserted into its own slot in a card cage. An operator or a robot may install the module onto a board, card cage, shelf, or cabinet. A jumper cable module of variable capacity can be implemented using a modular approach. In such a module, pulleys and cams are added/subtracted from the corresponding stacks as needed to increase/decrease capacity of the module. Various materials and methods of manufacture may be employed in producing the modules. For example, the modules may be made of plastic and produced using injection molding.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

What is claimed is:

1. A jumper cable module, comprising:

(a) a pulley connected to a base plate; and (b) a cam pivotally connected to said base plate, wherein: the jumper cable module is configured to provide tensioning to a jumper cable (i) placed within the jumper cable module and (ii) connected to connection points, which tensioning is achieved by rotating the cam to a selected angular position.

2. The invention of claim 1, further comprising a tensioning mechanism configured to fix the cam in the selected angular position.

3. The invention of claim 2, wherein the tensioning mechanism comprises:

(1) a set of nested holes in the cam arranged in a circle around the pivoting point of said cam;

(2) a set of matching nested holes in the base plate; and (3) at least one pair of spring-loaded balls inserted into at least one pair of holes of the cam and base plate, wherein the at least one pair of spring-loaded balls skips and settles in a matching pair of nested holes as the cam is rotated about the pivoting point.

4. The invention of claim 2, wherein the tensioning mechanism comprises a serrated edge ratchet.

5. The invention of claim 1, wherein the pulley comprises a grooved disk pivotally connected to the base plate.

6. The invention of claim 1, wherein the cam comprises a rectangular plate with rounded corners, which rectangular plate is grooved along at least a portion of its perimeter.

7. The invention of claim 1, further comprising a round plate attached to the cam, wherein the center of the round plate corresponds to the pivoting point of the cam and the cam further comprises a structure extending beyond the round plate to enable rotation of the cam.

8. The invention of claim 1, further comprising a spring-loaded leg connected between the base plate and a board with the spring of the leg positioned between the base plate and the board to provide support for the jumper cable module.

9. The invention of claim 1, wherein:

the pulley is part of a stack of two or more pulleys connected to the base plate;

the cam is part of a stack of two or more cams pivotally connected to the base plate, wherein each cam in the stack of cams has a separate tensioning mechanism and rotates independently of the other cams to provide tensioning for a different jumper cable.

10. The invention of claim 9, wherein the jumper cable module is configured to add or subtract one or more pairs of pulleys and cams to increase or decrease capacity of the jumper cable module.

11. A method of tensioning a jumper cable connected to connection points, the method comprising the steps of:

(a) placing the jumper cable within a jumper module, wherein the jumper cable module comprises a pulley connected to a base plate and a cam pivotally connected to said base plate; and (b) rotating the cam to a selected angular position to achieve desired tension in the jumper cable.

12. The invention of claim 11, wherein the jumper cable module further comprises a tensioning mechanism and step (b) comprises the step of fixing the cam at the selected angular position using the tensioning mechanism.

13. The invention of claim 12, wherein the tensioning mechanism comprises:

(1) a set of nested holes in the cam arranged in a circle around the pivoting point of said cam;

(2) a set of matching nested holes in the base plate; and (3) at least one pair of spring-loaded balls inserted into the holes of the cam and base plate, wherein, in step (b), the at least one pair of spring-loaded balls skips and settles in a matching pair of nested holes.

14. The invention of claim 12, wherein the tensioning mechanism comprises a serrated edge ratchet.

15. The invention of claim 11, wherein the pulley comprises a grooved disk pivotally connected to the base plate and step (a) comprises the step of wrapping the jumper cable around the pulley one or more times.

16. The invention of claim 11, wherein the cam comprises a rectangular plate with rounded corners, which rectangular plate is grooved along at least a portion of its perimeter, and step (a) comprises the step of placing the jumper cable within the groove of the cam.

17. The invention of claim 11, further comprising a round plate attached to the cam, wherein the center of the round plate corresponds to the pivoting point of the cam.

18. The invention of claim 11, further comprising a spring-loaded leg connected between the base plate and a board with the spring of the leg positioned between the base plate and the board to provide support for the jumper cable module.

19. The invention of claim 11, wherein:
the pulley is part of a stack of two or more pulleys connected to the base plate;
the cam is part of a stack of two or more cams pivotally connected to the base plate, wherein each cam in the stack of cams has a separate tensioning mechanism and step (b) comprises the step of rotating each cam in the stack of cams independently of the other cams to provide tensioning for a different jumper cable.

20. The invention of claim 19, wherein the jumper cable module is configured to add or subtract one or more pairs of pulleys and cams to increase or decrease capacity of the jumper cable module.

* * * * *